United States Patent
Dwyer et al.

(10) Patent No.: US 11,521,772 B2
(45) Date of Patent: Dec. 6, 2022

(54) MULTILAYER MAGNETIC CIRCUIT ASSEMBLY

(71) Applicant: Honeywell International Inc., Morris Plains, NJ (US)

(72) Inventors: Paul W. Dwyer, Seattle, WA (US); Neha Kulkarni, Sammamish, WA (US); Stephen F. Becka, North Bend, WA (US)

(73) Assignee: Honeywell International Inc., Charlotte, NC (US)

( * ) Notice: Subject to any disclaimer, the term of this patent is extended or adjusted under 35 U.S.C. 154(b) by 99 days.

(21) Appl. No.: 16/787,777

(22) Filed: Feb. 11, 2020

(65) Prior Publication Data
US 2021/0246557 A1     Aug. 12, 2021

(51) Int. Cl.
  *H01F 7/02*     (2006.01)
  *C23C 18/16*    (2006.01)
  (Continued)

(52) U.S. Cl.
  CPC ............. *H01F 7/02* (2013.01); *C23C 18/165* (2013.01); *C23C 18/1669* (2013.01);
  (Continued)

(58) Field of Classification Search
  CPC ... C23C 18/165; C23C 18/1669; C23C 18/38; C23C 18/42; G01P 15/08; G01P 15/125; G01P 15/132; G01P 2015/0828; G01P 2015/0837; H01F 7/02; H01F 7/0205; H01F 7/0273; H01F 7/0289; H01F 3/10; H01F 3/12; H01P 11/00
  See application file for complete search history.

(56) References Cited

U.S. PATENT DOCUMENTS 3,323,372 A    6/1967   Kistler et al.
3,438,266 A    4/1969   Carow et al.
               (Continued)

FOREIGN PATENT DOCUMENTS

CN    102998481     3/2013
EP    0273048 B1    5/1993
      (Continued)

OTHER PUBLICATIONS

U.S. Appl. No. 16/787,725, by Honeywell Aerospace (Inventors: Dwyer et al.), filed Feb. 11, 2020.
(Continued)

*Primary Examiner* — Mohamad A Musleh
(74) *Attorney, Agent, or Firm* — Shumaker & Sieffert, P.A.

(57) ABSTRACT

The disclosure describes a magnetic circuit assembly that includes a magnet assembly and an excitation ring. The magnet assembly defines an input axis and includes a pole piece and a magnet underlying the pole piece. The excitation ring includes a base and an outer ring positioned around the magnet assembly. The base includes a platform layer underlying the magnet and a base layer underlying the platform layer. The outer ring overlies the base layer. An inner portion of the outer ring faces the magnet assembly and an outer portion of the outer ring is configured to couple to an outer radial portion of a proof mass assembly. The pole piece and the platform layer include a high magnetic permeability material.

18 Claims, 9 Drawing Sheets

(51) Int. Cl.
*C23C 18/38* (2006.01)
*C23C 18/42* (2006.01)
*H01P 11/00* (2006.01)
*G01P 15/125* (2006.01)
*G01P 15/08* (2006.01)
*G01P 15/13* (2006.01)

(52) U.S. Cl.
CPC .............. *C23C 18/38* (2013.01); *C23C 18/42* (2013.01); *G01P 15/08* (2013.01); *G01P 15/125* (2013.01); *G01P 15/132* (2013.01); *H01F 7/0205* (2013.01); *H01F 7/0273* (2013.01); *H01F 7/0289* (2013.01); *H01P 11/00* (2013.01)

(56) References Cited

U.S. PATENT DOCUMENTS

| | | | |
|---|---|---|---|
| 3,635,298 | A | 1/1972 | Kistler |
| 3,702,073 | A * | 11/1972 | Jacobs .................. G01P 15/132 73/514.32 |
| 4,320,412 | A | 3/1982 | Hynes et al. |
| 4,592,234 | A | 6/1986 | Norling |
| 4,658,647 | A * | 4/1987 | Shintani .................. G01P 1/006 73/497 |
| 4,697,455 | A * | 10/1987 | Norling ................. G01P 15/132 73/497 |
| 4,726,228 | A | 2/1988 | Norling |
| 4,854,169 | A | 8/1989 | Sakuma et al. |
| 4,872,342 | A | 10/1989 | Hanson |
| 5,109,693 | A | 5/1992 | Hojo et al. |
| 5,111,694 | A | 5/1992 | Foote |
| 5,182,949 | A | 2/1993 | Rupnick et al. |
| 5,186,053 | A | 2/1993 | Egley et al. |
| 5,212,984 | A | 5/1993 | Norling et al. |
| 5,532,665 | A | 7/1996 | Foote et al. |
| 5,557,044 | A | 9/1996 | Foote et al. |
| 5,856,772 | A | 1/1999 | Foote et al. |
| 6,335,845 | B1 | 1/2002 | Yamaguchi et al. |
| 6,422,076 | B1 | 7/2002 | Prokofiev et al. |
| 7,100,447 | B2 | 9/2006 | Dwyer |
| 7,191,654 | B2 | 3/2007 | Dwyer et al. |
| 7,926,348 | B2 | 4/2011 | Dwyer |
| 8,215,169 | B2 | 7/2012 | Roehnelt |
| 8,528,405 | B2 | 9/2013 | Jenkins et al. |
| 9,016,126 | B2 | 4/2015 | Dwyer et al. |
| 9,488,671 | B2 | 11/2016 | Levy |
| 9,658,244 | B2 | 5/2017 | Dwyer et al. |
| 9,784,759 | B2 | 10/2017 | Cox |
| 10,161,956 | B2 | 12/2018 | Dwyer |
| 2003/0188578 | A1 | 10/2003 | Ando |
| 2006/0117853 | A1 * | 6/2006 | Dwyer .................. G01P 15/132 73/514.17 |
| 2009/0205424 | A1 | 8/2009 | Roehnelt et al. |
| 2009/0235745 | A1 * | 9/2009 | Dwyer .................... G01P 15/11 73/514.23 |
| 2009/0261691 | A1 | 10/2009 | Maeda |
| 2014/0109673 | A1 | 4/2014 | Roehnelt et al. |
| 2014/0374847 | A1 | 12/2014 | Hrovat |
| 2017/0010297 | A1 | 1/2017 | Dwyer et al. |
| 2017/0115321 | A1 | 4/2017 | Dwyer et al. |
| 2017/0307653 | A1 | 10/2017 | Dwyer |
| 2020/0072862 | A1 | 3/2020 | Dwyer et al. |

FOREIGN PATENT DOCUMENTS

| | | |
|---|---|---|
| EP | 3159702 A1 | 4/2017 |
| EP | 3239724 A1 | 11/2017 |
| JP | H08292208 A | 11/1996 |
| JP | 2002168878 A | 6/2002 |
| JP | 2011174901 A | 9/2011 |
| RU | 2485524 C2 | 6/2013 |

OTHER PUBLICATIONS

Extended Search Report from counterpart European Application No. 21153874.9, dated Jul. 9, 2021, 7 pp.
"Alloy 49 Technical Data," Invar 49 Tech Data, High Temp Metals, accessed from http://www.hightempmetals.com/techdata/hitemplnvar49data.php, accessed on Aug. 22, 2019, 7 pp.
Response to the Extended Search Report dated Jul. 9, 2021, from counterpart European Application No. 21153874.9, filed Jul. 8, 2021, 43 pp.

* cited by examiner

MULTILAYER MAGNETIC CIRCUIT ASSEMBLY

TECHNICAL FIELD

The present disclosure relates to systems and techniques for reducing magnetic field variation in transducers.

BACKGROUND

A transducer may detect a directional stimulus along an input axis and translate that stimulus into a measurement signal. The transducer may detect the directional stimulus by detecting displacement of a proof mass assembly along the input axis. The proof mass assembly may be positioned between two magnetic circuit assemblies that each produce a magnetic field, and coils on the proof mass assembly may interact with the magnetic field. During operation, the proof mass assembly may be subject to various dynamic conditions that reduce an accuracy of the transducer. These dynamic conditions may cause deviations in displacement of the proof mass assembly and, as a result, deviations in the output of the transducer.

SUMMARY

Magnetic circuit assemblies described herein may be utilized as part of a transducer, such as an accelerometer, to improve an accuracy of the transducer by producing a more stable and uniform magnetic field. In some examples, a transducer includes a pair of magnetic circuit assemblies and a proof mass assembly positioned between the magnetic circuit assemblies. Each magnetic circuit assembly may include a magnet for generating a magnetic field and an excitation ring for providing a magnetic return path of the magnetic field. The excitation ring may be coupled to both the magnet and an outer portion of the proof mass assembly. During operation, a magnetic return path may extend through a bottom of the magnet into the excitation ring, and magnetic flux may saturate in a region of the excitation ring near an edge of the magnet. Similarly, the magnetic return path may extend through a top of the magnet from the excitation ring via a pole piece and coil gap, and magnetic flux may saturate in a region of the pole piece near an edge of the magnet.

In some examples, the excitation ring includes a multilayer base underlying the magnet and an outer ring overlying the base and surrounding the magnet. The multilayer base includes a platform layer directly underlying the magnet and a base layer underlying the platform layer and the outer ring. The platform layer and the pole piece each have a relatively high magnetic permeability, such that a greater amount of magnetic flux may pass into the excitation ring and pole piece before saturation is reached. As a result, the magnet may create a more consistent magnetic field with which the proof mass assembly may interact.

In some examples, the magnetic permeability of the outer ring may be varied, such that an outer portion of the outer ring has a lower magnetic permeability than the inner portion of the outer ring. For example, the magnetic flux through the magnetic return path may be proportional to a length of the return path and decrease radially through the outer ring, such that an outer portion of a monolithic outer ring may have a lower magnetic flux density than an inner portion of the outer ring. As a result, the magnetic flux density in the outer portion may be substantially lower than saturation. The composition and/or density of the outer portion may be configured to reduce the magnetic permeability of the outer portion so that the magnetic flux density of the outer portion may be closer to saturation. As a result, the outer portion having a lower material density may be manufactured less expensively than a monolithic outer ring.

In some examples, the coefficient of thermal expansion (CTE) of the outer ring may be varied, such that the outer portion of the outer ring has a lower CTE than the inner portion of the outer ring. For example, a certain outer portion of the outer ring may couple to the proof mass assembly. This outer portion may have a CTE that more closely matches a CTE of the proof mass assembly, thereby reducing the thermal stress on the proof mass assembly. The inner portion may have a CTE that is not as closely matched to the CTE of the proof mass assembly, such that a greater variety of materials, such as less expensive materials, may be used to form the inner portion.

In some examples, the magnetic permeability of the pole piece may be varied, such that an upper portion of the pole piece has a higher magnetic permeability than a lower portion of the pole piece. For example, the coils of the proof mass assembly may interact with the magnetic field in response to the magnetic flux in the coil gap. A portion of the magnetic flux may exit a top of the pole piece, and a magnetic flux exiting the sides of the pole piece near a top of the pole piece may be lower than near the bottom of the pole piece. The density of the pole piece may be configured to reduce the magnetic permeability of an inner portion and/or a lower portion of the pole piece so that less magnetic flux may exit the top of the pole piece and/or a more uniform amount of magnetic flux may exit the sides of the pole piece. As a result, the coils of the proof mass assembly may interact with a more contained and/or uniform magnetic field directed by the pole piece.

In some examples, the excitation ring may include one or more linearity modules in linearity cavities of the outer ring. For example, the proof mass assembly may include various portions that are asymmetrical, such as flexures, such that a center of mass of the proof mass assembly may not correspond to a geometric center of the excitation ring. Inclusion of the one or more linearity modules may lower the magnetic flux near the flexures to create a center of the magnetic field of the excitation ring that is more closely aligned with the center of mass of the proof mass assembly, while also providing support for the excitation ring. As a result, the excitation ring may have increased support during lapping and, corresponding, increased flatness, while also generating a magnetic field that more accurately interacts with the proof mass assembly.

In some examples, the disclosure describes a magnetic circuit assembly that includes a magnet assembly and an excitation ring. The magnet assembly defines an input axis and includes a pole piece and a magnet underlying the pole piece. The excitation ring includes a base and an outer ring. The base includes a platform layer underlying the magnet and a base layer underlying the platform layer. The outer ring is positioned around the magnet assembly and an inner portion of the outer ring faces the magnet assembly. An outer portion of the outer ring is configured to couple to an outer radial portion of a proof mass assembly. The pole piece and the platform layer include a high magnetic permeability material.

In some examples, the disclosure describes a transducer, an upper magnetic circuit assembly, a lower magnetic circuit assembly, and a proof mass assembly. The proof mass assembly positioned between the upper and lower magnetic circuit assemblies. Each of the upper and lower magnetic circuit assemblies includes a magnet assembly and an excitation ring. The magnet assembly defines an input axis and includes a pole piece and a magnet underlying the pole piece. The excitation ring includes a base and an outer ring. The base includes a platform layer underlying the magnet and a base layer underlying the platform layer. The outer ring is positioned around the magnet assembly and an inner portion of the outer ring faces the magnet assembly. An outer portion of the outer ring is configured to couple to an outer radial portion of a proof mass assembly. The pole piece and the platform layer include a high magnetic permeability material.

In some examples, the disclosure describes a method of forming a magnetic circuit assembly that includes forming a base layer and an outer ring overlying the base layer. The method further includes forming a platform layer on a surface of the base layer to form an excitation ring. The method further includes forming a magnet and a pole piece on an upper surface of the platform layer to form a magnetic circuit assembly. The platform layer and the pole piece include a high magnetic permeability material.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1A:
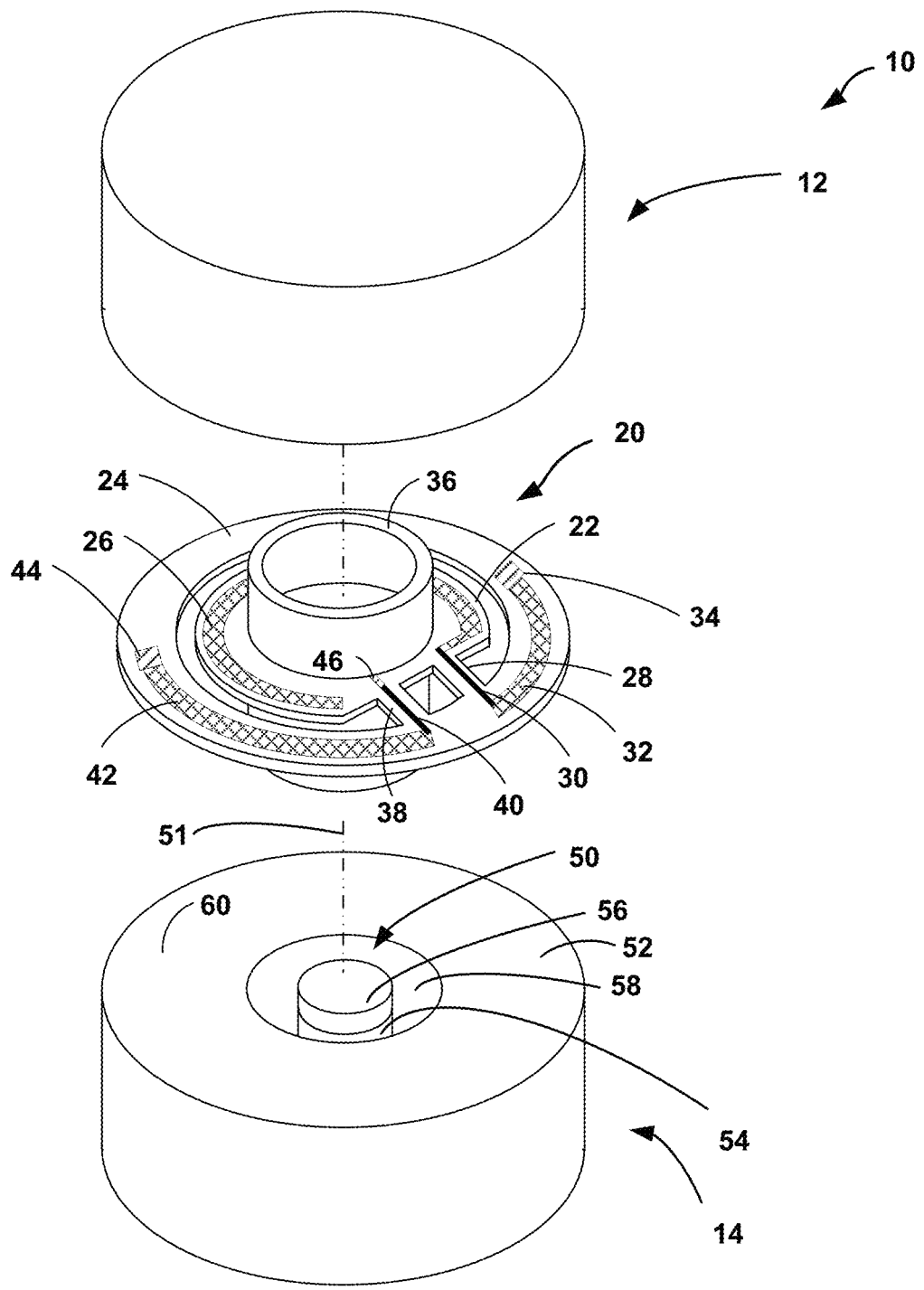
FIG. 1A is an exploded view diagram illustrating an example transducer.

FIG. 1A is an exploded view diagram illustrating an example transducer 10 (e.g., a force-rebalance accelerometer) that includes an upper magnetic circuit assembly 12, a lower magnetic circuit assembly 14 (e.g., collectively "upper and lower magnetic circuit assemblies 12 and 14"), and a proof mass assembly 20 positioned between upper and lower magnetic circuit assemblies 12 and 14. Proof mass assembly 20 may include a proof mass 22, a support structure 24, and a first flexure 28 and a second flexure 38 (collectively "flexures 28 and 38") flexibly connecting proof mass 22 to support structure 24.

Support structure 24 may provide structural support for proof mass 22 and help maintain separation between proof mass 22 and upper and lower magnetic circuit assemblies 12 and 14. Although support structure 24 as shown in FIG. 1A is a circular shape, support structure 24 may be any shape (e.g., square, rectangular, oval, or the like) and may or may not surround proof mass 22. Proof mass 22 may be flexibly coupled to support structure 24 using one or more flexures 28 and 38 to support proof mass 22 within support structure 24 and enable proof mass 22 to move about the plane defined by support structure 24. For example, flexures 28 and 38 may be stiff in a radial direction (e.g., perpendicular to input axis 51) and flexible in a vertical direction (e.g., along input axis 51), such that flexures 28 and 38 allow proof mass 22 to move in a direction substantially orthogonal (e.g., orthogonal or nearly orthogonal) to a plane defined by support structure 24 due to acceleration of transducer 10. Support structure 24 may include mounting pads 34 and 44 and one or more electrical traces 32 and 42. Flexures 28 and 38 may contain one or more thin film leads 30 and 40 on an upper or lower surface of the respective flexure of flexures 28 and 38 configured to transmit an electrical signal across the respective flexure.

In the example of FIG. 1A, proof mass assembly 20 may be clamped by magnetic circuit assemblies 12 and 14 at an outside diameter of proof mass assembly 20. Upper and lower magnetic circuit assemblies 12 and 14 may be attached (e.g., clamped) to opposite sides of proof mass assembly 20 using one or more of the respective mounting pads (e.g., mounting pads 34 and 44). Mounting pads 34 and 44 may be positioned at various locations on support structure 24, and may take on any form or shape and be present in any quantity. In some examples, mounting pads 34 and 44 may be raised such that when transducer 10 is fully assembled, mounting pads 34 and 44 may contact upper and lower magnetic circuit assemblies 12 and 14 to separate proof mass assembly 20 from upper and lower magnetic circuit assemblies 12 and 14, as well as provide mounting support for proof mass assembly 20. For example, a height of mounting pads 34 and 44 may define capacitive gaps between upper and lower magnetic circuit assemblies 12 and 14 and upper and lower capacitance pick-off plates (e.g., upper capacitance pick-off plate 26) on proof mass 22.

Proof mass 22 may include one or more capacitance pick-off plates (e.g., upper capacitance pick-off plate 26) and one or more force-rebalance coils (e.g., upper force-rebalance coil 36) mounted on upper and/or lower surfaces of proof mass 22. In some examples, upper capacitance pick-off plate 26 and upper force-rebalance coil 36 may be configured to interact with upper magnetic circuit assembly 12 to measure the acceleration applied to transducer 10. For example, as acceleration is applied to transducer 10, proof mass 22 may deflect from a null position, causing a distance of the capacitance gap between upper capacitance pick-off plate 26 and the inwardly facing surface of upper magnetic circuit assembly 12 to change (e.g., increase or decrease), resulting in a change in a capacitance and, correspondingly, a change in a capacitance measurement. In some examples, the change in the capacitance may be used to determine the amount of acceleration applied to transducer 10.

Additionally or alternatively, transducer 10 may be configured to apply an electrical current to upper force-rebalancing coil 36 (e.g., through thin film lead 40) based on the change in the capacitance, such that upper force-rebalancing coil 36 in conjunction with a magnetic pole piece of upper magnetic circuit assembly 12 acts as a servo to maintain the position of proof mass 22 at a null position. A current applied to upper force-rebalancing coil 36 to maintain proof mass 22 at the null position may be used to determine an amount of directional stimulus, such as acceleration, applied to transducer 10. For example, a magnitude of the current to rebalancing coils 36 may be a measure of acceleration of proof mass 22 along input axis 51. While the disclosure describes the operation of transducer 10 in terms of upper capacitance pick-off plate 26 and upper force-rebalance coil 36, such descriptions may equally apply to the use of a lower capacitance pick-off plate and lower force-rebalance coil, combinations of upper and lower capacitance pick-off plates and lower force-rebalance coils.

In some examples, components of proof mass assembly 20, such as support structure 24 and proof mass 22, may be made from a relatively low CTE material. A relatively low CTE material may be a material having a CTE less than or equal to about 3 ppm/° C. For example, proof mass assembly may be manufactured from fused silica having a CTE of about 0.5 ppm/° C.

Upper and lower magnetic circuit assemblies 12 and 14 each include a magnet assembly 50 and an excitation ring 52 (not labeled for upper magnetic circuit assembly 12). Magnet assembly 50 defines input axis 51 through transducer 10. Magnet assembly 50 includes a pole piece 56 and a magnet 54 underlying pole piece 56. Magnet 54 may be configured to provide a magnetic field to drive magnetic circuits of lower magnetic circuit assembly 14. In some examples, magnet 54 may be made of Alnico, samarium-cobalt, neodymium-iron-boron, or other such materials. In some examples, magnet 54 may be manufactured from a relatively high CTE material. A relatively high CTE material may have a CTE higher than a relatively low CTE material, such as a relatively low CTE material of upper base layer 68 or outer ring 62. A relatively high CTE material may be, for example, a material having a CTE greater than about 8 ppm/° C. For example, magnet 54 may be manufactured from alnico, having a CTE of about 11 ppm/° C.

Excitation ring 52 may be configured to provide a magnetic return path for the magnetic field generated by magnet 54. For example, as will be shown further in FIG. 1B, excitation ring 52 may have a generally cylindrical shape with a "C" cross section. Pole piece 56 may be a magnetic structure that focuses a magnetic field created by magnet 54 to drive upper magnetic circuit assembly 12. For example, pole piece 56 may direct the magnetic field to flow through force-rebalancing coils 36. By directing the magnetic field through force-rebalancing coils 36, the magnetic field may enter excitation ring 52 and flow around to the opposite side of magnet 54 through excitation ring 52, and flow back through magnet 54 to pole piece 56, completing the magnetic circuit. In some examples, excitation ring 52 may be manufactured from materials having relatively high relative magnetic permeability, such as a maximum relative magnetic permeability greater than about 1500. In some examples, excitation ring 52 may be manufactured from materials that saturate at relatively high magnetic flux densities, such as greater than about 5000 gausses.

In some examples, upper and lower magnetic circuit assemblies 12 and 14 may include inwardly (i.e., toward proof mass assembly 20) facing surfaces 60 configured to interact with portions of proof mass assembly 20. Upper and lower magnetic circuit assemblies 12 and 14 may also include a coil gap 58 along a respective inwardly facing surface with magnet assembly positioned therein. Coil gap 58 may be configured to receive force-rebalancing coils 36 of proof mass assembly 20. In some examples, at least a portion of excitation ring 52 may be manufactured from a material having a relatively high relative magnetic permeability to provide a magnetic return path, such as invar or super invar.

The magnetic flux of magnetic circuit assemblies 12, 14 may vary along a magnetic return path. For example, portions of excitation ring 52 and pole piece 56 near an interface with magnet 54 and an outer radius of magnet 54 may experience higher magnetic flux than other parts of magnetic circuit assemblies 12 and 14. In some instances, a sufficiently high magnetic flux density may saturate, resulting in an uneven or unstable magnetic field with which proof mass assembly 20 may interact.

Figure 1B:
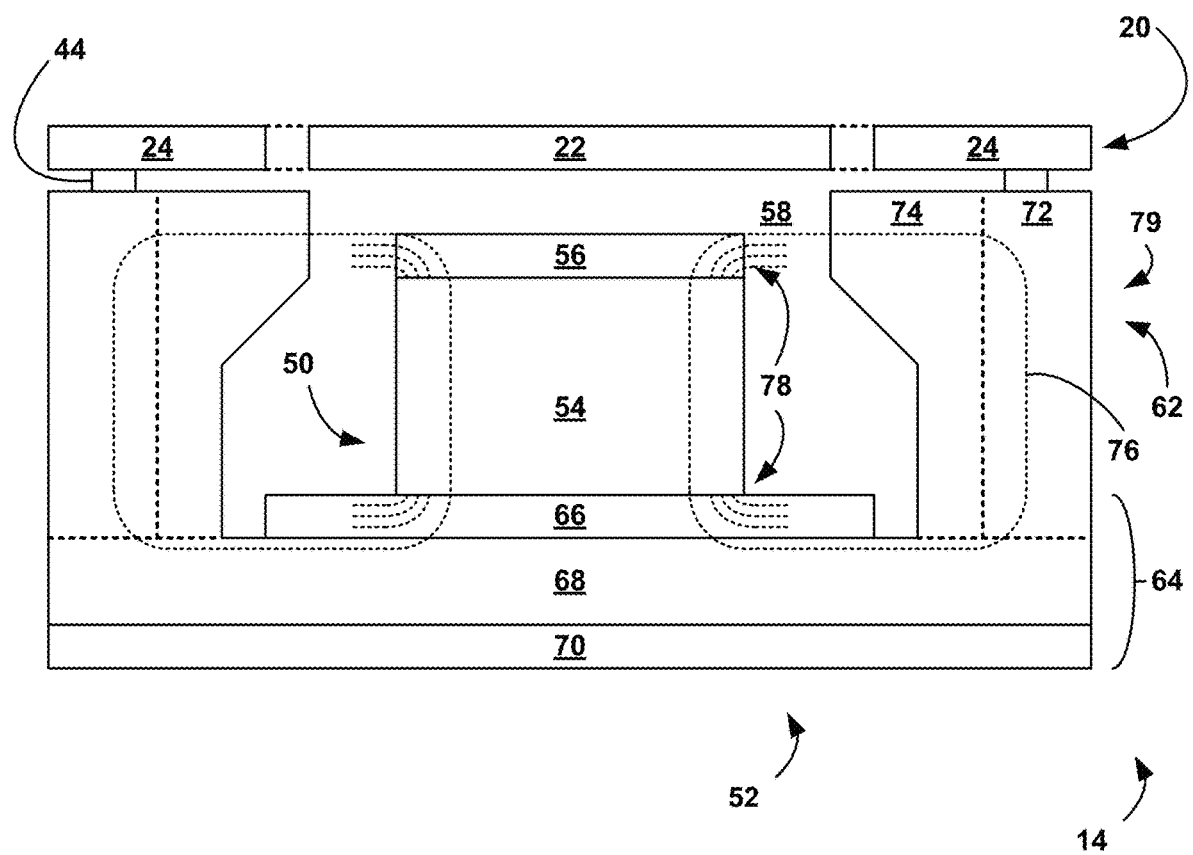
FIG. 1B is a cross-sectional side view diagram of an example proof mass assembly and magnetic circuit assembly that includes a high magnetic permeability platform layer and pole piece.

As discussed herein, magnetic circuit assemblies 12, 14 may be configured to reduce or eliminate magnetic saturation in the magnetic return path by incorporating high magnetic permeability materials in portions of excitation ring 52 and magnet assembly 50 that are near magnet 54 and receive a higher magnetic field strength. FIG. 1B is a cross-sectional side view diagram of an example proof mass assembly and lower magnetic circuit assembly 14 of FIG. 1A. Excitation ring 52 includes an outer ring 62 positioned around magnet assembly 50 and a base 64 underlying magnet assembly 50. While shown in FIG. 1B as a monolithic unit, in other examples, outer ring 62 and base 64 may be separate components. An inner portion 74 of outer ring 62 faces magnet assembly 50. An outer portion 72 of outer ring 62 is configured to couple to an outer radial portion of proof mass assembly 20.

Base 64 includes a platform layer 66 underlying magnet 54, an upper base layer 68 underlying platform layer 66 and outer ring 62, and a lower base layer 70 underlying upper base layer 68 (referred to collectively as "base layer 68 and 70"). Platform layer 66 may be coupled to magnet 54 using an adhesive layer (not shown). In some examples, the adhesive layer may be a conductive adhesive layer, such as a conductive epoxy. The adhesive layer may absorb radial stresses (e.g., shear stresses) between platform layer 66 and magnet 54.

Excitation ring 52 and pole piece 56 may be configured such that the magnetic flux density of a magnetic return path 76 does not saturate in portions of excitation ring 52 and pole piece 56 near magnet 54. Platform layer 66 and pole piece 56 may include one or more relatively high magnetic flux regions 78 at which a magnetic field strength may be higher compared to other portions of excitation ring 52 and/or magnet assembly 50, and for which a magnetic flux density may be closer to or at saturation compared to other portions of excitation ring 52 and/or magnet assembly 50. For example, a high magnetic flux region 78 of pole piece 56 may be near an outer radial portion of magnet 54 and near an interface between pole piece 56 and magnet 54. Similarly, a high magnetic flux region 78 of excitation ring 52 may be near an outer radial portion of magnet 54 and near an interface between excitation ring 52 and magnet 54.

In some examples, each of platform layer 66 and pole piece 56 may include a relatively high magnetic permeability material. In some examples, a relatively high magnetic permeability material may be a material that has a maximum relative magnetic permeability greater than about 1500. In some examples, a relatively high magnetic permeability material may be a material that has a magnetic flux density at saturation greater than about 5000 gausses. Magnetic permeability ($\mu$) may represent a measure of resistance of a material against the formation of a magnetic field, and may be related to magnetic flux density (B) and magnetic field strength (H), as illustrated in Equation 1 below:

$$\mu = \frac{B}{H} \quad \text{(Equation 1)}$$

As the magnetic flux density in a material reaches saturation, an increase in magnetic field strength may no longer substantially increase magnetic flux density. A higher magnetic permeability material may have a correspondingly higher magnetic field at which saturation occurs. For example, relatively high magnetic permeability iron alloys may have a magnetic saturation of at least about 8000 gausses. As such, a relatively high magnetic permeability material may permit platform layer 66 and pole piece 56 to have a higher magnetic flux density prior to becoming saturated, resulting in a more stable and/or less variable magnetic field. A variety of relatively high magnetic permeability materials may be used for pole piece 56 and/or platform layer 66 including, but not limited to, nickel-iron matrix materials having nickel content greater than about 40 percent, such as hipernom, and the like. In some examples, the nickel-iron matrix materials may have a nickel content greater than 75 percent, such as about 80 percent.

As noted above, materials of proof mass assembly 20 and magnetic circuit assemblies 12 and 14 may have different coefficients of thermal expansion (CTE). For example, magnet 54 may be manufactured from alnico or another material having a relatively high magnetic field strength. Proof mass assembly 20 may be manufactured from fused quartz or another material having a high elastic behavior, such that proof mass assembly 20 may deform from an original state to a flexed state in response to an applied stress and return to the original state once the applied stress is removed. Selecting materials for magnet 54 and/or proof mass assembly 20 based primarily on a similar CTE may result in a compromise in the important properties of magnet 54 and/or proof mass assembly 20. In some instances, a CTE of magnet 54 may be substantially higher than a CTE of proof mass assembly 20; for example, a CTE of Alnico may be about 11 ppm/° C., while a CTE of fused silica may be about 0.5 ppm/° C. When transducer 10 undergoes changes in temperature, differences in CTE between magnet 54 and excitation ring 52 and/or between excitation ring 52 and proof mass assembly 20, may create radial stresses that distort or displace proof mass assembly 20.

To absorb radial stresses from magnet 54, platform layer 66 and/or pole piece 56 may be coupled to magnet 54 using an adhesive layer (not shown). A thickness of the adhesive layer between either platform layer 66 or pole piece 56 and magnet 54 may correspond to a difference in thermal expansion between platform layer 66 or pole piece 56 and magnet 54, such that a lower difference in thermal expansion may result in a thinner or absent adhesive layer. As the adhesive layer thickness decreases with reduced radial stresses, variation in reluctance of the magnetic return path of excitation ring 52 with temperature may decrease. Thus, by reducing thermally-induced radial stresses between platform layer 66 or pole piece 56 and magnet 54, excitation ring 52 may have an improved (e.g., reduced variation) magnetic flux profile.

To reduce radial stresses between platform layer 66 and magnet 54 and/or between pole piece 56 and magnet 54, a composition of platform layer 66 and/or pole piece 56 may be selected to substantially match a CTE of platform layer 66 and/or pole piece 56 to a CTE of magnet 54. For example, a material of platform layer 66 and/or pole piece 56 may have a CTE that is substantially similar to (e.g., within about 4 ppm/° C. at room temperature) a CTE of the material of magnet 54, such that radial stresses caused by a CTE mismatch between magnet 54 and excitation ring 52 and/or pole piece 56 may be reduced. In some examples, platform layer 66 and/or pole piece 56 include a relatively high CTE material. A relatively high CTE material may be, for example, a material that has a CTE greater than or equal to 8 ppm/° C. A variety of materials may be used for platform layer 66 and/or pole piece 56 including, but not limited to, nickel-iron alloy material having a nickel concentration greater than about 40 percent, such as hipernom, and the like.

To reduce thermally-induced radial stresses between proof mass assembly 20 and outer ring 62, outer ring 62 and base 64 may be configured such that radial expansion of outer ring 62 and base 64 over an anticipated temperature operating range may be substantially similar to radial expansion of proof mass assembly 20 over the anticipated temperature operating range. For example, two types of strain may occur at an interface between proof mass assembly 20 and outer ring 62 may include a radial strain and a conical strain. A radial strain from a mismatch of CTEs of proof mass assembly 20 and outer ring 62 may cause distortion due to an asymmetry in proof mass assembly 20. A coning strain caused by magnet 54 shrinking faster than platform layer 66 may cause a top surface of platform layer 66 to concave. Reducing a difference between radial expansion of outer ring 62 and base 64 and radial expansion of proof mass assembly 20, such as by selecting a composition, diameter, and/or thickness of platform layer 66 and lower base layer 70, may reduce these radial and coning strains. As a result, stresses that may cause displacement or distortion of proof mass assembly 20 may be reduced.

In some examples, a composition of outer ring 62 and upper base layer 68 may be selected to substantially match a CTE of outer portion 72 of outer ring 62 and upper base layer 68 to a CTE of proof mass assembly 20, such that a difference between the CTE of the material of outer ring 62 and the CTE of upper base layer 68. To reduce a CTE mismatch between outer ring 62 and upper base layer 68 and proof mass assembly 20, the materials of outer ring 62 and upper base layer 68 may each have a CTE that is substantially similar to (e.g., within about 2 ppm/° C. at room temperature) a CTE of the material(s) of proof mass assembly 20, such that radial stresses caused by a CTE mismatch between magnet 54 and excitation ring 52 may be reduced. In some examples, outer ring 62 and upper base layer 68 include a relatively low CTE material. A relatively low CTE material may have a CTE lower than a relatively higher CTE material, such as a relatively high CTE material of platform layer 66, lower base layer 68, magnet 54, or pole piece 56. A relatively low CTE material may be, for example, a material that has a CTE less than or equal to about 3 ppm/° C. As explained above, proof mass assembly 20 may be manufactured from a relatively low CTE material, such as fused quartz (0.5 ppm/° C.).

In some examples, upper base layer 68 and outer ring 62 may include a same material. For example, while upper base layer 68 and outer ring 62 may be differentiated through a grain or other boundary, as indicated by the dashed line, upper base layer 68 and outer ring 62 may have substantially similar properties. In some examples, upper base layer 68 and outer ring 62 may be monolithic (e.g., without differentiation). For example, outer ring 62 and upper base layer 68 may be manufactured through casting or additive deposition. A variety of materials may be used for outer ring 62 and/or upper base layer 68 including, but not limited to, invar, super invar, kovar, soft iron, and the like. In some examples, outer ring 62 and upper base layer 68 include a material having a relatively high relative magnetic permeability, such as a maximum relative magnetic permeability greater than about 1500.

In some examples, to reduce thermally-induced radial stresses between proof mass assembly 20 and outer ring 62, outer ring 62 and base 64 may be configured such that a plane of surface 60 of outer ring 62 is substantially planar over an anticipated temperature operating range. For example, a component of radial expansion may be caused by a bowing effect due to a difference in radial expansion between two adjacent layers. In base 64, radial stresses between platform layer 66 and upper base layer 68 may produce shear strain that, if not counteracted, by cause base 64 to bow outward and outer ring 62 to exert increase radial stress on proof mass assembly 20. In some examples, lower base layer 70 may include a relatively high CTE material. As explained above, platform layer 66 may include a relatively high CTE material. To balance (e.g., "common mode") an amount of radial stress exerted by platform layer 66 and lower base layer 70, the material of lower base layer 70 may have a CTE that is substantially similar to (e.g., within about 2 ppm/° C. at room temperature) a CTE of the material of platform layer 66. A variety of materials may be used for lower base layer 70 including, but not limited to, nickel-iron alloy material having a nickel concentration greater than about 40 percent, such as hipernom, and the like. In some examples, platform layer 66 and lower base layer 70 include a same material. For example, lower base layer 70 may compensate for strain incurred on outer ring 62 and upper base layer 68 by platform layer 66. In some instances, such common-moding of properties may be accomplished by using a same material for both platform layer 66 and lower base layer 70, with dimensional changes, such as a diameter or thickness, making up for the strain on platform layer 66 caused magnet 54.

By reducing thermally-induced radial stresses between proof mass assembly 20 and outer ring 62, proof mass assembly 20 may experience less distortion as a result of temperature changes and, as such, have reduced error. As one example, by selecting a relatively low CTE material for outer ring 62 and upper base layer 68 extending through excitation ring 52, excitation ring 52 may have an effective CTE that is substantially similar to proof mass assembly 20. As another example, by balancing a thermal strain between platform layer 66 and lower base layer 70, excitation ring 52 may reduce or eliminate any bowing of base 64 in response to thermal changes.

While described in terms of CTE, in some examples, materials of platform layer 66, upper base layer 68, lower base layer 70, and outer ring 62 may be selected for other properties related to an amount of radial stress between excitation ring 52 and either of magnet 54 or proof mass assembly 20. For example, in addition or alternative to a CTE mismatch between layers, a shear stress between two layers, such as platform layer 66 and upper base layer 68, may be related to an elasticity of each layer. As a temperature increases, a shear stress is created at an interface between magnet 54 and platform layer 66, and thereby between platform layer 66 and upper base layer 68, which may result in a deflection of platform layer 66. As such, upper base layer 68 and lower base layer 70 may be configured to produce a similar and opposite shear stress to reduce or prevent substantial deflection of platform layer 66. To control an amount of radial expansion, a material of platform layer 66, upper base layer 68, and/or lower base layer 70 may be selected to have an elasticity and/or CTE such that a shear stress between platform layer 66 and upper base layer 68 and/or a shear stress between upper base layer 68 and lower base layer 70 may be substantially similar. As a result, base 64 may not substantially bend in response to a change in temperature.

In some examples, magnetic circuit assemblies 12 and 14 may be configured to increase axial expansion (e.g., along input axis 51) of magnet assembly 50 with respect to outer ring 62. For example, as a temperature of transducer 10 changes, a distance of coil gaps 58 may change due to a difference in CTE between outer ring 62 and pole piece 56. To compensate for this change in coil gaps 58, magnet 54 and pole piece 56 may each have a relatively high CTE, such that magnet assembly 50 has an effective axial CTE that is greater than an axial CTE of outer ring 62. If pole piece 56 has a higher CTE than outer ring 62, coil gaps 58 may get smaller as the temperature rises. As such, as a temperature increases, a size of coil gaps 58 may decrease, thereby compensating for a reduction in magneto-motive force and reducing a scale factor temperature coefficient of transducer 10.

While some portions of excitation ring 52 and/or magnet assembly 50 along magnetic return path 76 may have relatively high magnetic flux densities, other portions of magnetic return path 76 may have relatively low magnetic flux densities. Outer ring 62 may include one or more relatively low magnetic flux regions 79 at which a magnetic field strength may be relatively low, and for which a magnetic flux density may be further from saturation, compared to other portions of excitation ring 52. For example, in a magnetic circuit, the magnetic flux may tend to take a path of least reluctance (R), which may be represented by Equation 2 below:

$$R = \frac{l}{\mu A} \quad \text{(Equation 2)}$$

In Equation 2 above, l is a length of magnetic return path 76, µ is a magnetic permeability of the material, and A is a cross-sectional area of magnetic return path 76 (i.e., a cross-sectional area perpendicular to the direction of magnetic flux). As such, in a magnetic return path of a uniform material, the most magnetic flux will pass through the inner portion of the material, as this is the shortest distance back to the other end of the magnet. As the length of the magnetic return path increases, so does the reluctance, resulting in less magnetic flux at the outer edges of the magnetic return path. A relatively low magnetic flux region 79 of outer ring 62 may be located at an outer portion 72 of outer ring 62. Relatively low magnetic flux regions 79, such as inner portion 74 of outer ring 62, may contribute substantially less magnetic flux to excitation ring 52 compared to other portions of excitation ring 52, such as outer portion 72 of outer ring 62. As such, a relatively high magnetic permeability material may contribute relatively less to magnetic flux on a volume basis at these relatively low magnetic flux regions 79 than at other regions that are subject to a higher magnetic field strength. While discussed in terms of cross-sectional area, it will be understood that a mass of a material for a given volume may be expressed by mass density, such that a volume having a material and a void matrix may have a lower bulk mass density as described herein than a volume that includes only the material. In other instances, such as instances in which voids in a void matrix may be microscopic, a cross-sectional area of the magnetic flux may represent a cross-sectional area of the material without the void matrix (e.g., a material fraction).

In some examples, a magnetic permeability of inner portion 74 of outer ring 62 may be greater than a magnetic permeability of outer portion 72 of outer ring 62. For example, a magnetic permeability of a volume may be related to both a magnetic permeability of a material in the volume and an amount of the material in the volume. As such, a composition and/or a material fraction of a material in a volume in outer ring 62 may be selected or configured such that the magnetic permeability by volume of inner portion 74 of outer ring 62 is less than a magnetic permeability by volume of outer portion 72 of outer ring 62. For example, a cross-sectional area of the material may be varied such that a material along magnetic return path 76 may carry an amount of magnetic flux that is closer to saturation for the material to reduce an amount of material while avoiding saturation. As a result, outer ring 62 may use a smaller amount of relatively high magnetic permeability material, thereby reducing a cost and/or weight of transducer 10.

In some examples, a cross-sectional area of outer ring 62 may be configured such that a magnetic permeability of inner portion 74 is less than a magnetic permeability of outer portion 72. For example, a cross-sectional area of outer portion 72 of outer ring 62 may be less than a cross-sectional area of inner portion 74 of outer ring 62. Outer portion 72 may include a matrix of pores or other voids resulting in a locally reduced cross-sectional area. Similarly, inner portion 74 may include no matrix of pores or voids, or a reduced volume of pores or voids, resulting in a locally higher cross-sectional area. Due to a reduced amount of material in outer portion 72, the magnetic flux density of outer portion 72 may be lower than the magnetic flux density of outer portion 72. In some examples, outer ring 62 is monolithic (e.g., includes a continuous phase). For example, a cross-sectional area of outer ring 62 may increase radially from an inner surface of outer ring 62 to an outer surface of outer ring 62, thereby creating a density gradient.

In some examples, outer ring 62 includes one or more structured volumes. For example, as mentioned above, inner portion 74 and/or outer portion 72 of outer ring 62 may include pores or voids to reduce an amount of material used for inner portion 74 and/or outer portion 72. In addition to defining pores or voids, structures between the pore or voids may provide support for inner portion 74 and/or outer portion 72.

Figure 6:
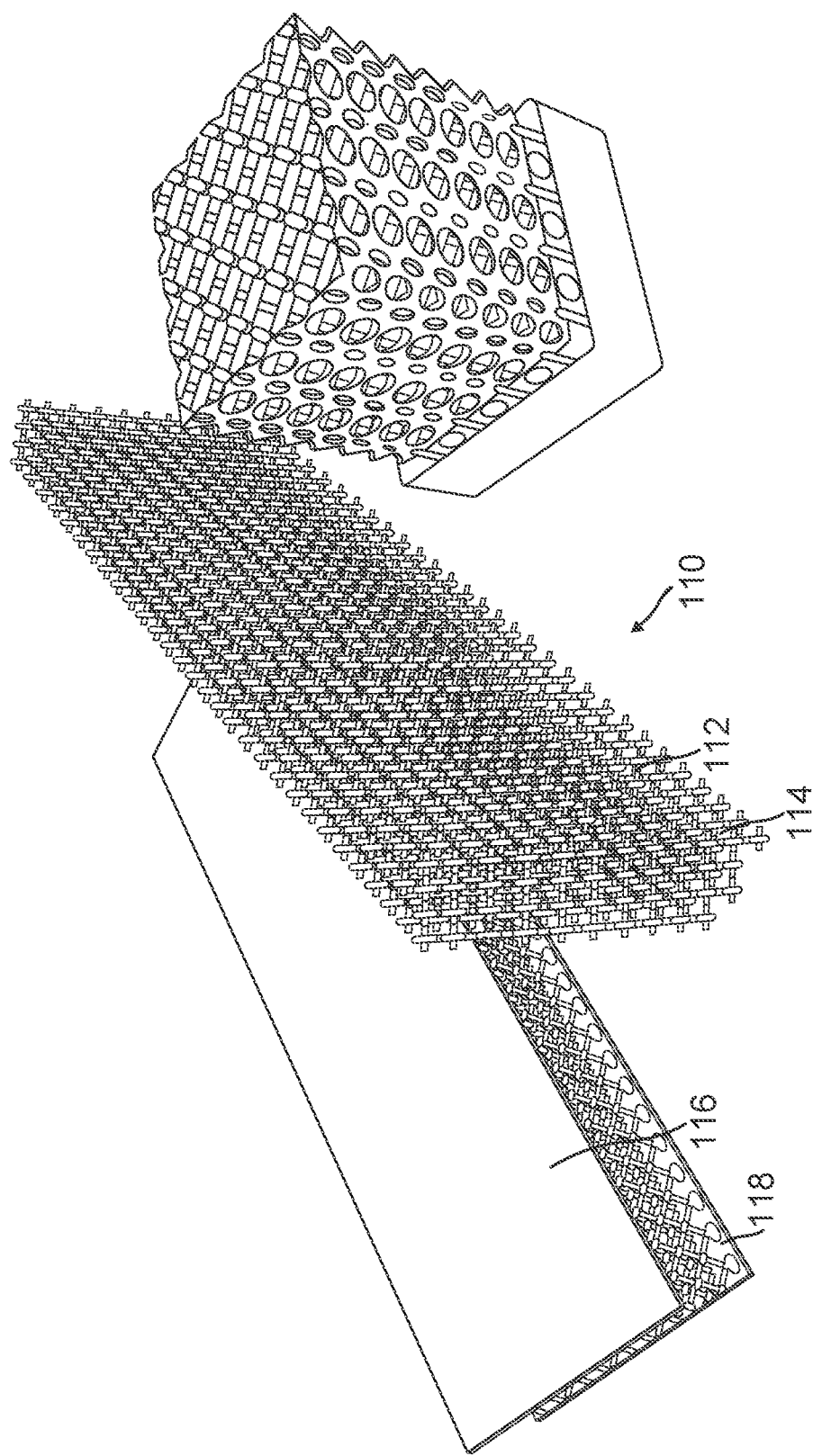
FIG. 6 is a photograph of an example structured volume of an outer ring of a magnetic circuit assembly.

FIG. 6 is a photograph of an example structured volume 110 of outer ring 62. As shown in FIG. 6, structured volume 110 includes structures 112 and pores 114 between structures 112. Structured volume is bounded by walls, such as an exterior wall 116 of outer ring 62 and an interior wall 118 of outer ring 62. The walls may be closed off to reduce or prevent particulate contamination and/or may be configured to transmit a substantial portion of magnetic flux through outer ring 62. For example, exterior wall 116 may receive a substantially higher amount of magnetic flux than structured volume 110, such that the magnetic flux transmitted through outer ring 62 having structured volume 110 may be substantially similar (e.g., >80%) to a magnetic flux transmitted through outer ring 62 not having a structured volume (e.g., solid).

Figure 2A:
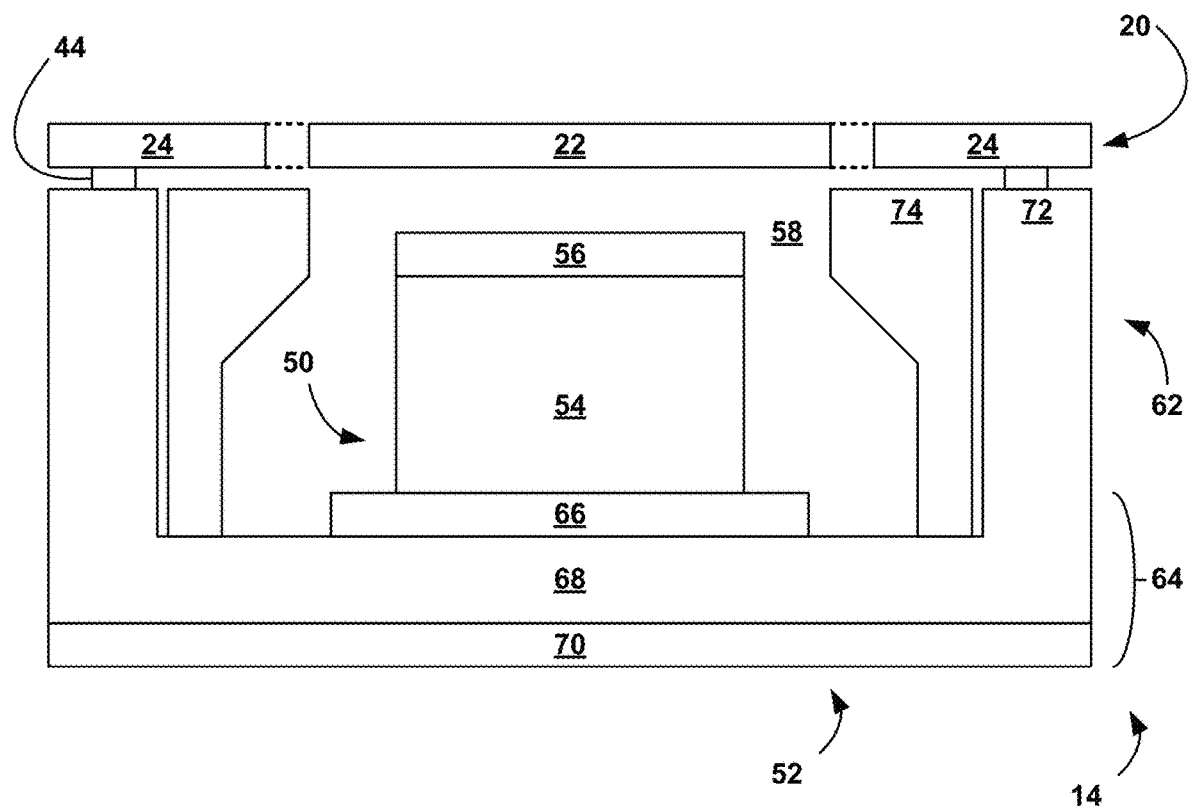
FIG. 2A is a cross-sectional side view diagram of an example proof mass assembly and magnetic circuit assembly that includes a variable magnetic permeability outer ring.

FIG. 2A is a cross-sectional side view diagram of an example proof mass assembly and magnetic circuit assembly that includes a variable magnetic permeability outer ring. As shown in FIG. 2A, inner portion 74 of outer ring 62 is separate (e.g., structurally or compositionally differentiated) from outer portion 72 of outer ring 62. For example, outer portion 72 may be monolithic with upper base layer 68, while inner portion 74 may overlie upper base layer 68.

In some examples, a composition of outer ring 62 may be selected such that a magnetic permeability of outer portion 72 is less than a magnetic permeability of inner portion 74. For example, inner portion 74 may include a relatively high magnetic permeability material that has a higher maximum relative magnetic permeability than a material of outer portion 72.

In some examples, outer ring 62 may be configured to have a relatively high magnetic permeability and a variable CTE. For example, as discussed above, to reduce radial stress on proof mass assembly 20, a portion of outer ring 62 coupled to proof mass assembly 20 may have a substantially similar CTE as proof mass assembly 20. In some examples, a CTE of a material of inner portion 74 is lower than a CTE of a material of outer portion 72. A relatively low CTE, relatively high magnetic permeability material may be relatively expensive compared to a higher CTE, relatively high magnetic permeability material. However, a large portion of outer ring 62 may not be coupled to proof mass assembly 20, such that inclusion of a relatively high CTE, relatively high magnetic permeability material in these portions may not provide sufficient benefit for a higher cost. As such, rather than form outer ring 62 as a monolithic unit having a relatively low CTE, relatively high magnetic permeability material, outer portion 72 may include a relatively low CTE material that has a CTE that is substantially similar to the CTE of proof mass assembly 20, while inner portion 74 may include a higher CTE material that has a CTE that is less similar to the CTE of proof mass assembly 20. In some examples, inner portion 74 of outer ring 62 includes invar and outer portion 72 of outer ring 62 includes super invar.

Figure 2B:
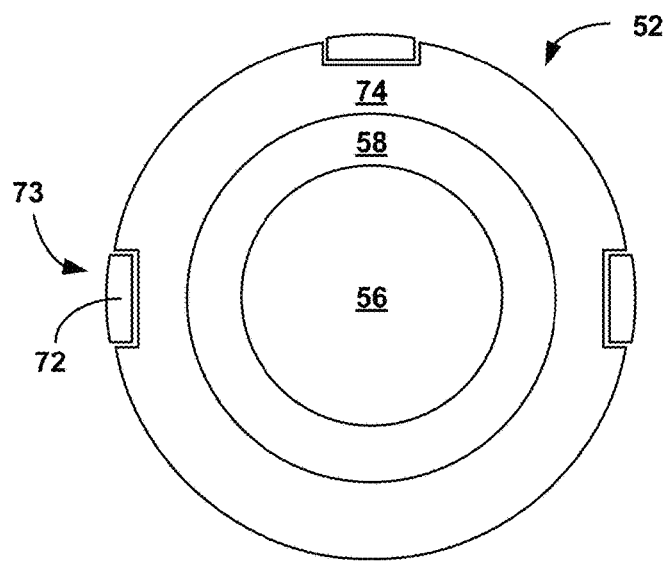
FIG. 2B is a top view diagram of the example magnetic circuit assembly of FIG. 2A.

FIG. 2B is a top view diagram of the example magnetic circuit assembly of FIG. 2A. As shown in FIG. 2B, three posts 73 of outer portion 72 may correspond to three points at which outer ring 62 may couple to proof mass assembly 20. Outer portion 72 and inner portion 74 of outer ring 62 may be separated by a gap, such that differential expansion and contraction of outer portion 72 and inner portion 74 due to a difference in CTE may be accommodated.

Figure 3A:
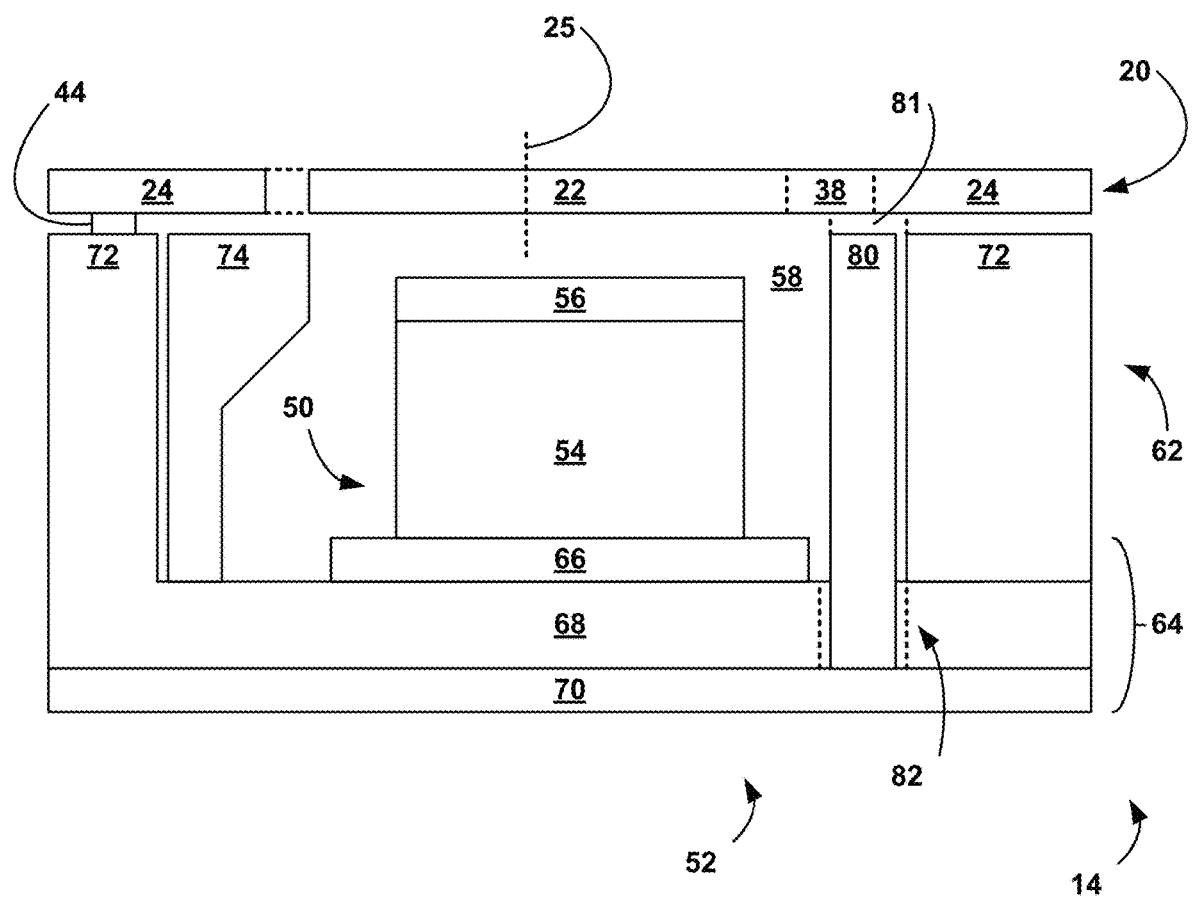
FIG. 3A is a cross-sectional side view diagram of an example proof mass assembly and magnetic circuit assembly that includes an outer ring having a partial non-magnetic return path to support more uniform lapping

In some examples, magnetic circuit assemblies 12, 14 may be configured to produce an asymmetrical magnetic field using a structurally supported excitation ring 52 to more uniformly and/or stably interact with proof mass assembly 20. FIG. 3A is a cross-sectional side view diagram of an example proof mass assembly 20 and magnetic circuit assembly that includes an outer ring 62. Proof mass assembly 20 may include relatively less mass proximal to flexures 38, 48 and relatively more mass distal to flexures 38, 48, which may cause a center of mass 25 of proof mass assembly 20 to shift towards a distal end of proof mass assembly 20. To produce a substantially radially symmetrical force on proof mass assembly 20, a magnetic flux of a magnetic field corresponding to this lower mass area may be substantially lower than (e.g., about one-third of) other portions of proof mass assembly 20. In the presence of a symmetrical magnetic field and in response to an input stimulus, proof mass assembly 20 may tilt and short toward a respective magnetic circuit assembly 12, 14 at a lower G level, causing inaccuracies.

In some examples, outer ring 62 includes one or more linearity cavities 81 in an inner surface of outer ring 62. For example, the one or more linearity cavities 81 may each correspond to a portion of outer ring 62 with a reduced radial thickness compared to a maximum radial thickness of outer ring 62. The one or more linearity cavities 81 may be configured to more closely align a center of magnetic flux of magnetic circuit assemblies 12, 14 with center of mass 25 of proof mass assembly 20, such that the center of magnetic force and center of mass 25 may be in conformity. For example, the absence of a relatively high magnetic permeability material in the one or more linearity cavities 81 may lower a magnetic permeability of outer ring 62 near flexures 38, 48, causing the center of magnetic flux to shift distal from flexures 38, 48 toward center of mass 25 of proof mass assembly 20 and reducing the magnetic flux on a side of proof mass assembly 20 where flexures 28, 38 reside. The asymmetry of outer ring 62 may cause the center of magnetic flux of magnetic circuit assembly 12, 14 to better align with center of mass 25 of proof mass assembly 20 compared to outer rings that do not include the one or more linearity cavities 81. In some examples, the one or more linearity cavities 81 may be configured to shift center of mass 25 between about 10 and about 50 mils from a geometric center of proof mass assembly 20, such as about 20 mils.

In some examples, excitation ring 52 includes one or more linearity modules 80 positioned in at least a portion of the one or more linearity cavities 81. The one or more linearity modules 80 may include a relatively low magnetic permeability material to cause the center of magnetic flux to shift distal (e.g., to a left in FIG. 3A) from flexures 38, 48. In some examples, the one or more linearity modules 80 include a non-magnetic material, such as stainless steel. In some examples, each of the one or more linearity modules 80 may be positioned in the one or more linearity cavities 81 to create a gap between outer ring 62 and the one or more linearity modules 80 to reduce or prevent strain effects. In some examples, a base of the one or more linearity modules may be cross-hatched to reduce strain at the base.

The one or more linearity modules 80 may be configured to maintain a more symmetrical structural configuration of outer ring 62. Without the one or more linearity modules 80, the one or more linearity cavities 81 may cause an asymmetry in surface 60 of excitation ring 52. For example, by removing a portion of outer ring 62 to form the one or more linearity cavities 81, surface 60 of excitation ring 52 may not be flat, which may cause proof mass assembly 20 to bend when magnetic circuit assemblies 12, 14 are clamped to proof mass assembly 20. A bend in proof mass assembly 20 may produce a bias in an output of transducer 10 that is not proportional to the input stimulus, which may cause an error in measurement. By including the one or more linearity modules in excitation ring 52, excitation ring 52 may have a higher flatness and parallelism compared to excitation rings that do not include the one or more linearity modules 80. By creating a flatter top surface of excitation ring 52, transducer 10 may have reduced bias, which may enable transducer 10 to more accurately determine an input stimulus.

In some examples, the one or more linearity modules 80 may be configured to be stiff in an axial direction (e.g., parallel to input axis 51). For example, the one or more linearity modules 80 have a similar resistance to lapping in the axial direction as a balance of excitation ring 52, such as outer ring 62, to achieve a flat part. In some examples, the one or more linearity modules 80 may be configured to be flexible in a radial direction (e.g., perpendicular to input axis 51). For example, the one or more linearity modules 80 may have radial flexibility in an adjacent region proximal to attachment to upper base layer 68, as upper base layer 68 may have a lower CTE. For example, the one or more linearity modules 80 may be additively manufactured, such as by three-dimensional (3D) printing, to have an air volume that may be higher in the radial direction than the axial direction. A region 82 of base 64, such as upper base layer 68, to which the one or more linearity modules 80 may be coupled may be locally stiffer to reduce or prevent warping of surface 60 of excitation ring 52.

Figure 3B:
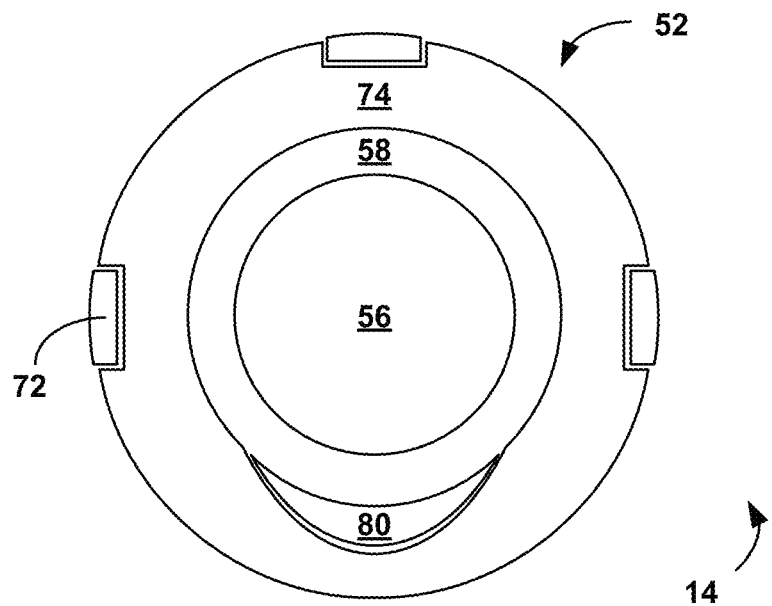
FIG. 3B is a top view diagram of the example magnetic circuit assembly of FIG. 3A.
Figure 3C:
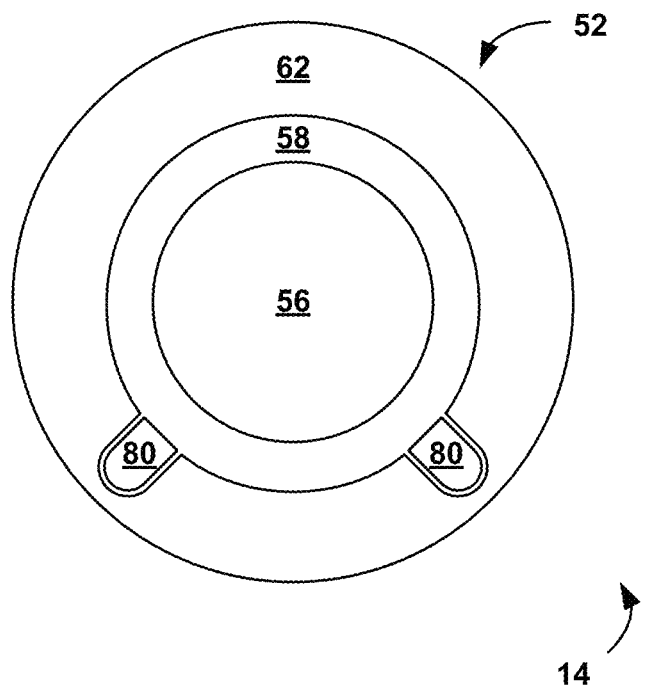
FIG. 3C is a top view diagram of an example magnetic circuit assembly that includes an outer ring having two partial non-magnetic return paths.

FIG. 3B is a top view diagram of the example magnetic circuit assembly of FIG. 3A. As illustrated in the example of FIG. 3B, excitation ring 52 may include a single linearity module 80 in a single linearity cavity 81. FIG. 3C is a top view diagram of an example magnetic circuit assembly that includes an outer ring having two non-magnetic return paths. As illustrated in the example of FIG. 3C, excitation ring 52 may include a plurality of linearity modules 80 in a plurality of linearity cavities 81 positioned at different circumferential positions along outer ring 62. While shown as a same size, the one or more linearity modules 80 may include a variety of sizes and quantities.

Figure 4A:
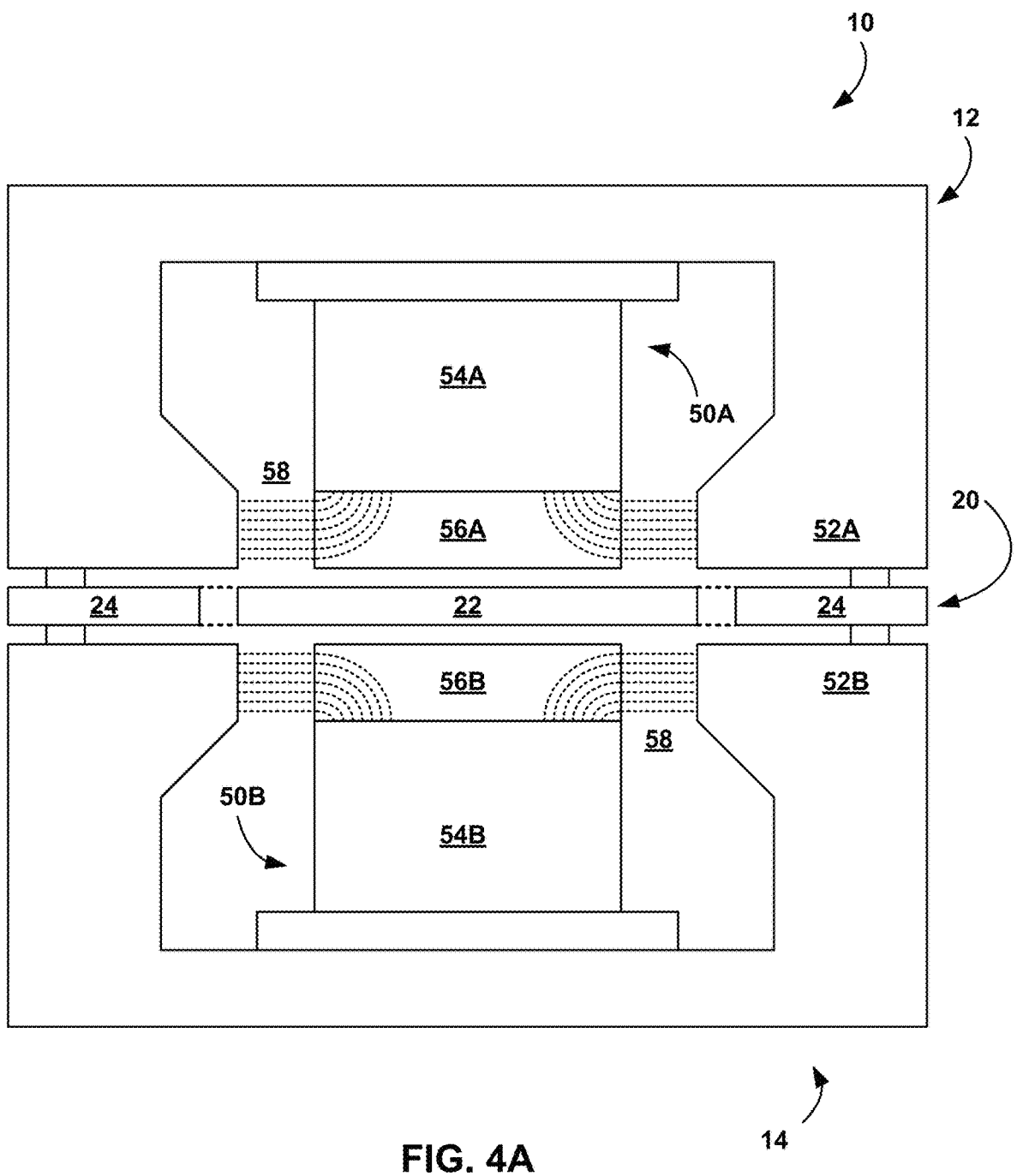
FIG. 4A is a cross-sectional side view diagram of an example transducer having magnetic circuit assemblies that include a variable magnetic permeability pole piece.

In some examples, magnetic circuit assemblies 12, 14 may be configured to produce a more contained magnetic field using a variable magnetic permeability pole piece 56. FIG. 4A is a cross-sectional side view diagram of an example transducer having magnetic circuit assemblies that include a variable magnetic permeability pole piece. Magnetic circuit assemblies 12, 14 each include magnets 54A, 54B, respectively. Magnets 54A, 54B face each other, and magnetic flux from magnetic circuit assemblies 12, 14, come in proximity, but may be configured to reduce crossing.

No two magnets are exactly alike, and the magnetic flux levels of both magnets 54A, 54N may be set after assembly with an exponentially decaying magnetic pulse. As a result, magnets 54A, 54B may not have the same magneto-motive force (MMF), which may cause a discrepancy between a center of magnetic force in a vertical direction (e.g., along input axis 51) and a capacitive center (geometric center) of transducer 10 and create variation in a location of a minimum field between the two opposing magnetic circuit assemblies 12, 14. Due to the diamagnetic effect of material of proof mass assembly 20, proof mass assembly 20 may tend to reside at the center of magnetic force, while an applied bias (e.g., modulated by coils of proof mass assembly 20) may drive proof mass assembly 20 to the capacitive center of transducer 10, thereby bending the proof mass assembly 20. Ideally, this magnetic minimum may be at the geometric center between the two magnetic circuit assemblies 12, 14. Minimizing the flux coming out of a top of pole piece 56 may approach this goal by reducing an amount of magnetic flux crossing. To the extent that this is not achieved, the applied bias may center proof mass assembly 20. Under dynamic conditions, proof mass assembly 20 may move, and if the magnetic field is not uniform, the coils of proof mass assembly 20 will cut different magnetic flux and change the resultant Lorentz force and the unit output to maintain servo. Magnetic flux at a top of magnets 54A, 54B may be further concentrated by the presence of the opposing magnetic field.

Additionally or alternatively, pole piece 56 may have a relatively high magnetic flux at a bottom edge near an interface of pole piece 56 and magnet 54, such that a magnetic flux through coil gap 58 may be relatively high near an interface between pole piece 56 and magnet 54 and relatively low near an outward facing surface of pole piece 56. Due to this axially uneven flux, a mechanical disturbance, such as vibration input, may cause the coils to interact with different magnetic flux and create vibration rectification. This error may degrade an ability of transducer 10 to perform the navigation function. As will be illustrated in FIGS. 4B-4D below, a shape and/or relative magnetic permeability of a respective pole piece 56 may be configured to reduce flux out of a top and/or lateral surface of each magnet 54, thereby creating a more uniform magnetic field.

Figure 4B:
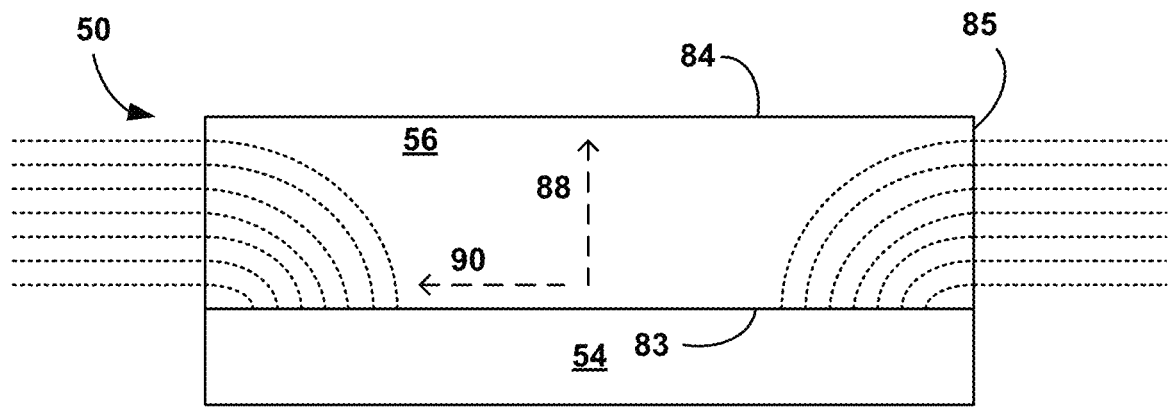
FIG. 4B is a cross-sectional side view diagram of an example magnet assembly of the example transducer of FIG. 4A.

In some examples, a mass density and/or cross-sectional area of pole piece 56 may be configured to produce a more stable magnetic field from magnetic circuit assemblies 12, 14. FIG. 4B is a cross-sectional side view diagram of an example magnet assembly 50 of the example transducer of FIG. 4A. Pole piece 56 may include an interface surface 83 at an interface between magnet 54 and pole piece 56, an inward-facing surface 84, and a lateral surface 85 facing excitation ring 52 (not shown).

To produce a more uniform magnetic flux through lateral surface 85, pole piece 56 may have an increasing magnetic permeability in an axial direction 88. In some examples, a magnetic permeability of a lower portion of pole piece 56, such as near interface surface 83, may be less than a magnetic permeability of an upper portion of pole piece 56, such as near inward-facing surface 84 (i.e., increasing magnetic permeability in an axial direction 88). As mentioned above, a magnetic field strength may decrease in axial direction 88. The increase in magnetic permeability of pole piece 56 in axial direction 88 and corresponding decrease in magnetic field strength in axial direction 88 may result in a more even magnetic flux through lateral surface 85 in axial direction 88. In some examples, the magnetic permeability may increase according to a gradient, while in other examples, the magnetic permeability may increase according to a step-function, or any combination of the two. In some examples, a mass density and/or cross-sectional area of the lower portion of pole piece 56 may be less than a mass density and/or cross-sectional area of the upper portion of pole piece 56. For example, pole piece 56 may include a relatively high magnetic permeability material, such that a lower mass density and/or cross-sectional area may correspond to a lower corresponding magnetic permeability by volume.

To reduce an amount of magnetic flux leaving inward-facing surface 84, pole piece 56 may have an increasing magnetic permeability in a radial direction 90. In some examples, a magnetic permeability in an inner portion of pole piece, 56, such as near a radial center of pole piece 56, may be less than a magnetic permeability of an outer portion of pole piece, such as near lateral surface 85 (i.e., increasing magnetic permeability in radial direction 90). In general, magnetic flux through the inner portion of may be more likely to exit through inward-facing surface 84 than magnetic flux through the outer portion. The relatively low magnetic permeability in the inner portion of pole piece 56 may limit an amount of magnetic flux through inward-facing surface 84, while the relatively high magnetic permeability in the outer portion of pole piece 56 may permit a high magnetic flux through lateral surface 85, resulting in a more axially-contained magnetic field. In some examples, the magnetic permeability may increase according to a gradient, while in other examples, the magnetic permeability may increase according to a step-function, or any combination of the two. In some examples, a mass density and/or cross-sectional area of the inner portion of pole piece 56 may be less than a mass density and/or cross-sectional area of the outer portion of pole piece 56. For example, pole piece 56 may include a relatively high magnetic permeability material, such that a lower mass density and/or cross-sectional area may correspond to a lower corresponding magnetic permeability by volume.

By increasing a magnetic permeability of pole piece 56 along axial direction 88, a distribution of magnetic flux from lateral surface 85 of pole piece 56 may be more uniform and/or linear in axial direction 88. By increasing a magnetic permeability of piece 56 along radial direction 90, magnetic flux from inward-facing surface 84 may be reduced, thereby reducing interaction between magnetic circuit assemblies 12, 14. As a result, magnetic flux encountered by a coil of proof mass assembly 20 may be more uniform and a vibration rectification error may be reduced.

Figure 4C:
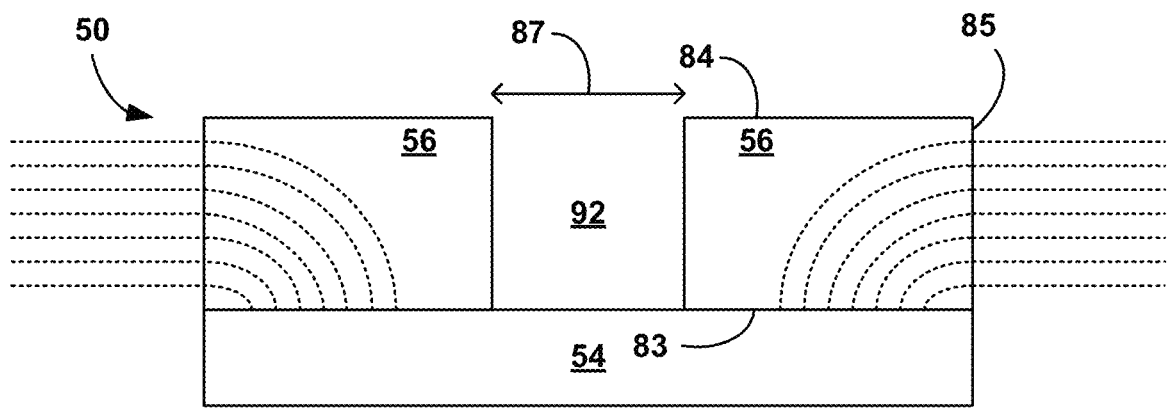
FIG. 4C is a cross-sectional side view diagram of an example magnet assembly having a pole piece with a cylindrical cavity.

In some examples, an inner portion of the pole piece includes a cavity. For example, rather than include a reduced magnetic permeability in the inner portion of pole piece 56, as described in FIG. 4B, the inner portion of pole piece 56 may be removed. FIG. 4C is a cross-sectional side view diagram of an example magnet assembly 50 having pole piece 56 with a cylindrical cavity 92. Cylindrical cavity 92 may have a diameter 87. In some examples, diameter 87 may be less than 50% of a total diameter of pole piece 56. In some examples, diameter 87 may be between about 1 millimeter and about 10 millimeters, such as about 4 millimeters. As diameter 87 increases, a surface area of interface surface 83 decreases in a radially outward direction, increasing the reluctance in the inner portion of pole piece 56 and resulting in a reduced amount of magnetic flux leaving the inner portion of pole piece 56.

Figure 4D:
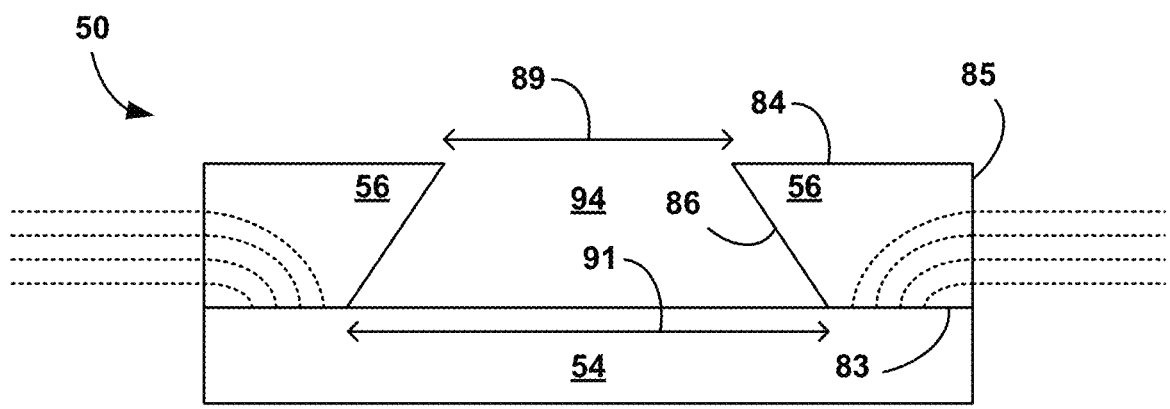
FIG. 4D is a cross-sectional side view diagram of an example magnet assembly having a pole piece with a conical cavity.

Cavity 92 may have a variety of shapes including, but not limited to, a conical cavity, a cylindrical cavity, a hemispherical cavity, or the like. In some examples, a shape of cavity 92 may be configured to further limit an amount of magnetic flux leaving inward-facing surface 84. FIG. 4D is a cross-sectional side view diagram of an example magnet assembly having a pole piece with a conical cavity 94. Conical cavity 94 may have an upper diameter 89 at the upper portion of cavity 94 (e.g., aligned with inward-facing surface 84) and a lower diameter 91 at the lower portion of cavity 94 (e.g., aligned with interface surface 83), in which upper diameter 89 is less than lower diameter 91. As a result, an interior surface 86 of pole piece 56 forms a non-square angle with interface surface 83. Lower diameter 91 may be selected to reduce magnetic flux at interface surface 83, while upper diameter 89 may be selected to reduce magnetic flux at inward-facing surface 84.

Figure 5:
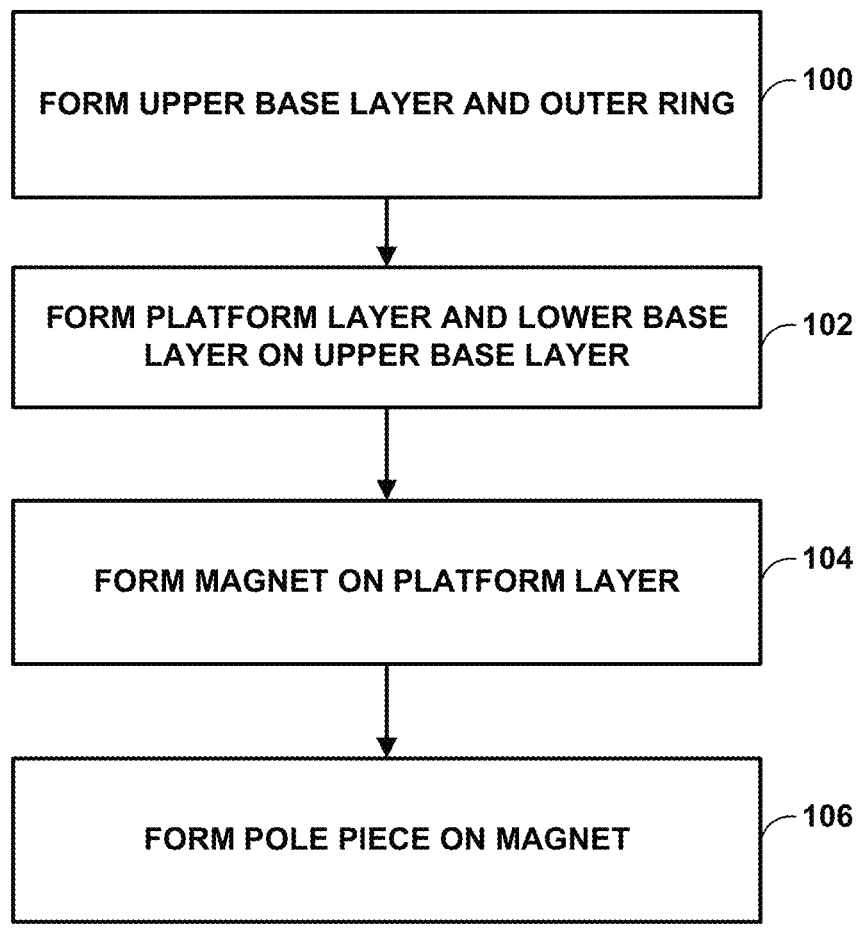
FIG. 5 is a flowchart illustrating an example method of manufacturing a magnetic circuit assembly.

FIG. 5 is a flowchart illustrating an example method of manufacturing a magnetic circuit assembly 12 or 14. FIG. 5 will be described with respect to magnetic circuit assemblies 12 and 14 of FIGS. 1-4; however, other magnetic circuit assemblies may be formed using the example method of FIG. 5. While certain manufacturing techniques may be further described with respect to certain components, the example method of FIG. 5 may include forming any of upper base layer 68, outer ring 62, lower base layer 70, platform layer 66, magnet 54, or pole piece 56 using a variety of techniques including, but not limited to: casting; molding; additive manufacturing, such as 3D printing; subtractive manufacturing, such as machining; joining; and the like.

In some examples, the method includes forming upper base layer 68 and outer ring 62 overlying upper base layer

68 (100). Upper base layer 68 and outer ring 62 may be formed using a variety of techniques including, but not limited to: casting; additive manufacturing, such as additive deposition; subtractive manufacturing; and the like. In some examples, upper base layer 68 and outer ring 62 may be formed separately and joined, such as by welding, adhesion, or the like. In some examples, upper base layer 68 and outer ring 62 may be monolithic.

In some examples, forming outer ring 62 may include forming outer portion 72 overlying an outer portion of upper base layer 68 (or monolithic with upper base layer 68) and forming inner portion 74 overlying a more radially inward portion of upper base layer 68. In some examples, forming outer ring 62 may include forming outer portion 72 with a first material and forming inner portion 74 with a second material having a lower magnetic permeability than the first material. For example, outer portion 72 may include a relatively high magnetic permeability material, while inner portion 74 may include a lower magnetic permeability material.

In some examples, forming outer ring 62 may include additively depositing a high magnetic permeability material on an upper surface of upper base layer 68. For example, additive deposition of outer ring 62 may enable local control of mass density and/or cross-sectional area, such as by controlling a pattern of material deposition or a ratio of air to material, such that a magnetic permeability of outer ring 62 may be spatially controlled. In some examples, forming outer ring 62 may include forming outer portion 72 at a first cross-sectional area and forming inner portion 74 at a second cross-sectional area that is greater than the first cross-sectional area. As a result, a cross-sectional area of inner portion 74 of outer ring 62, which may receive a higher magnetic flux than outer portion 72, is greater than a cross-sectional area of outer portion 72 of outer ring 62.

In some examples, forming outer ring 62 includes forming one or more linearity cavities 81 in outer ring 62. In some examples, the one or more linearity cavities 81 may be formed by additive deposition of outer ring 62, such that outer ring 62 includes the one or more linearity cavities 81. In some examples, the one or more linearity cavities may be formed by subtractive manufacturing, such that outer ring 62 may be formed symmetrically and material may be removed from outer ring 62 to form the one or more linearity cavities 81, such as by drilling.

In some examples, the method includes forming one or more linearity modules 80 in the one or more linearity cavities 81. For example, the one or more linearity modules 80 may include a low magnetic permeability material to create an asymmetrical excitation ring 52. In some examples, the one or more linearity modules 80 may be formed by additively depositing the low magnetic permeability material in the one or more linearity cavities 81. For example, the one or more linearity modules 80 may each be formed by varying an air volume while depositing the low magnetic permeability material radially, but not axially, such that the one or more linearity modules 80 may be stiff in an axial direction (e.g., parallel to input axis 51) and flexible in a radial direction (e.g., perpendicular to input axis 51). In some examples, the one or more linearity modules 80 may be formed by positioning the one or more linearity modules 80 in a cavity or on a surface of upper base layer 68 and coupling the one or more linearity modules 80 to upper base layer 68, such as by spot welding, adhesive, or the like. In some examples, coupling the one or more linearity modules 80 to upper base layer 68 may include depositing lower base layer 70 on a surface of both the one or more linearity modules 80 and upper base layer 68. In some examples, forming upper base layer 68 may include forming region 82 having a higher stiffness.

In some examples, the method includes forming platform layer 66 on a first surface of upper base layer 68 and forming lower base layer 70 on a second surface, opposite the first surface, of upper base layer 68 to form excitation ring 52 (102). Platform layer 66 includes a relatively high magnetic permeability material.

In some examples, the method includes forming magnet 54 on an upper surface of platform layer 66 (104). In some examples, magnet 54 may be formed separate from platform layer 66 and coupled to platform layer 66 using an adhesive layer. In examples in which platform layer 66 includes a relatively high CTE material, such that a CTE of platform layer 66 may be substantially similar to a CTE of magnet 54, a thickness of the adhesive layer may be relatively small, thereby reducing a reluctance of the adhesive layer.

In some examples, the method includes forming pole piece 56 on an upper surface of magnet 54 (106). Pole piece 56 includes a relatively high magnetic permeability material. In some examples, forming pole piece 56 may include additively depositing a relatively high magnetic permeability material on an upper surface of magnet 54. For example, as described with respect to formation of outer ring 62 above, additive deposition of pole piece 56 may enable local control of mass density and/or cross-sectional area, such as by controlling a ratio of air to material, such that a magnetic permeability of pole piece may be spatially controlled. In some examples, forming pole piece 56 may include forming an upper portion of pole piece 56 at a first mass density and/or cross-sectional area and forming a lower portion of pole piece 56 at a second mass density and/or cross-sectional area that is less than the first mass density and/or cross-sectional area. As a result, a mass density and/or cross-sectional area of an inner portion of pole piece 56 may be less than a mass density and/or cross-sectional area of an outer portion of pole piece 56. In some examples, forming pole piece 56 may include forming an outer portion at a first mass density and/or cross-sectional area and forming an inner portion at a second mass density and/or cross-sectional area that is less than the first mass density and/or cross-sectional area. As a result, a mass density and/or cross-sectional area of an inner portion of pole piece 56 may be less than a mass density and/or cross-sectional area of an outer portion of pole piece 56.

Various examples have been described. These and other examples are within the scope of the following claims.

What is claimed is:

1. A magnetic circuit assembly comprising:
   a magnet assembly defining an input axis, wherein the magnet assembly comprises:
      a pole piece, wherein the pole piece comprises a high magnetic permeability material; and
      a magnet underlying the pole piece; and
   an excitation ring, comprising:
      a base, comprising:
         a platform layer underlying the magnet, wherein the platform layer comprises a high magnetic permeability material;
         a base layer underlying the platform layer; and
      an outer ring overlying the base layer, wherein the outer ring is positioned around the magnet assembly, wherein an inner portion of the outer ring faces the magnet assembly, wherein an outer portion of the outer ring is configured to couple to an outer radial portion of a proof mass assembly, wherein the outer ring comprises one or more linearity cavities, wherein the excitation ring comprises one or more linearity modules in the one or more linearity cavities, and wherein the one or more linearity modules comprise a low magnetic permeability material.

2. The magnetic circuit assembly of claim 1, wherein each high magnetic permeability material has a maximum relative magnetic permeability greater than about 1500.

3. The magnetic circuit assembly of claim 1, wherein each of the pole piece and the platform layer comprise hipernom.

4. The magnetic circuit assembly of claim 1, wherein a cross-sectional area of the inner portion of the outer ring is less than a cross-sectional area of the outer portion of the outer ring.

5. The magnetic circuit assembly of claim 1, wherein the outer ring is monolithic.

6. The magnetic circuit assembly of claim 1, wherein a magnetic permeability of the inner portion of the outer ring is less than a magnetic permeability of the outer portion of the outer ring.

7. The magnetic circuit assembly of claim 1,
wherein the inner portion of the outer ring comprises invar, and
wherein the outer portion of the outer ring comprises super invar.

8. The magnetic circuit assembly of claim 1, wherein a cross-sectional area of a lower portion of the pole piece is less than a cross-sectional area of an upper portion of the pole piece.

9. The magnetic circuit assembly of claim 1, wherein a cross-sectional area of an inner portion of the pole piece is less than a cross-sectional area of an outer portion of the pole piece.

10. The magnetic circuit assembly of claim 1, wherein the inner portion of the pole piece includes a cavity.

11. The magnetic circuit assembly of claim 10, wherein a diameter of the cavity at an upper portion of the cavity is less than a diameter of the cavity at a lower portion of the cavity.

12. The magnetic circuit assembly of claim 1, wherein the one or more linearity modules comprise stainless steel.

13. A transducer, comprising:
an upper magnetic circuit assembly;
a lower magnetic circuit assembly; and
a proof mass assembly positioned between the upper and lower magnetic circuit assemblies,
wherein each of the upper and lower magnetic circuit assemblies comprises:
a magnet assembly defining an input axis, wherein the magnet assembly comprises:
a pole piece, wherein the pole piece comprises a high magnetic permeability material; and
a magnet underlying the pole piece; and
an excitation ring, comprising:
a base, comprising:
a platform layer underlying the magnet, wherein the platform layer comprises a high magnetic permeability material;
a base layer underlying the platform layer; and
an outer ring overlying the base layer, wherein the outer ring is positioned around the magnet assembly, wherein an inner portion of the outer ring faces the magnet assembly, wherein an outer portion of the outer ring is configured to couple to an outer radial portion of a proof mass assembly, wherein the outer ring comprises one or more linearity cavities, wherein the excitation ring comprises one or more linearity modules in the one or more linearity cavities, and wherein the one or more linearity modules comprise a low magnetic permeability material.

14. The transducer of claim 13, wherein each high magnetic permeability material has a maximum relative magnetic permeability greater than about 1500.

15. A method of forming a magnetic circuit assembly, comprising:
forming a base layer and an outer ring overlying the base layer;
forming a platform layer on a surface of the base layer to form an excitation ring, wherein the platform layer comprises a high magnetic permeability material;
forming a magnet on an upper surface of the platform layer; and
forming a pole piece on an upper surface of the magnet, wherein the pole piece comprises a high magnetic permeability material,
wherein the outer ring comprises one or more linearity cavities,
wherein forming the magnetic circuit assembly further comprises forming one or more linearity modules in the one or more linearity cavities, and
wherein the one or more linearity modules comprise a low magnetic permeability material.

16. The method of claim 15, wherein each high magnetic permeability material has a maximum relative magnetic permeability greater than about 1500.

17. The method of claim 15,
wherein forming the outer ring further comprises additively depositing a high magnetic permeability material on the upper surface of the base layer,
wherein a cross-sectional area of an inner portion of the outer ring is less than a cross-sectional area of an outer portion of the outer ring.

18. The method of claim 15,
wherein forming the pole piece further comprises additively depositing the high magnetic permeability material on the upper surface of the magnet,
wherein a cross-sectional area of a lower portion of the pole piece is less than a cross-sectional area of an upper portion of the pole piece, and
wherein a cross-sectional area of an inner portion of the pole piece is less than a cross-sectional area of an outer portion of the pole piece.

* * * * *